May 10, 1938.   S. R. HOWARD   2,116,895
PACKAGING MACHINE
Filed Oct. 20, 1933   7 Sheets-Sheet 6
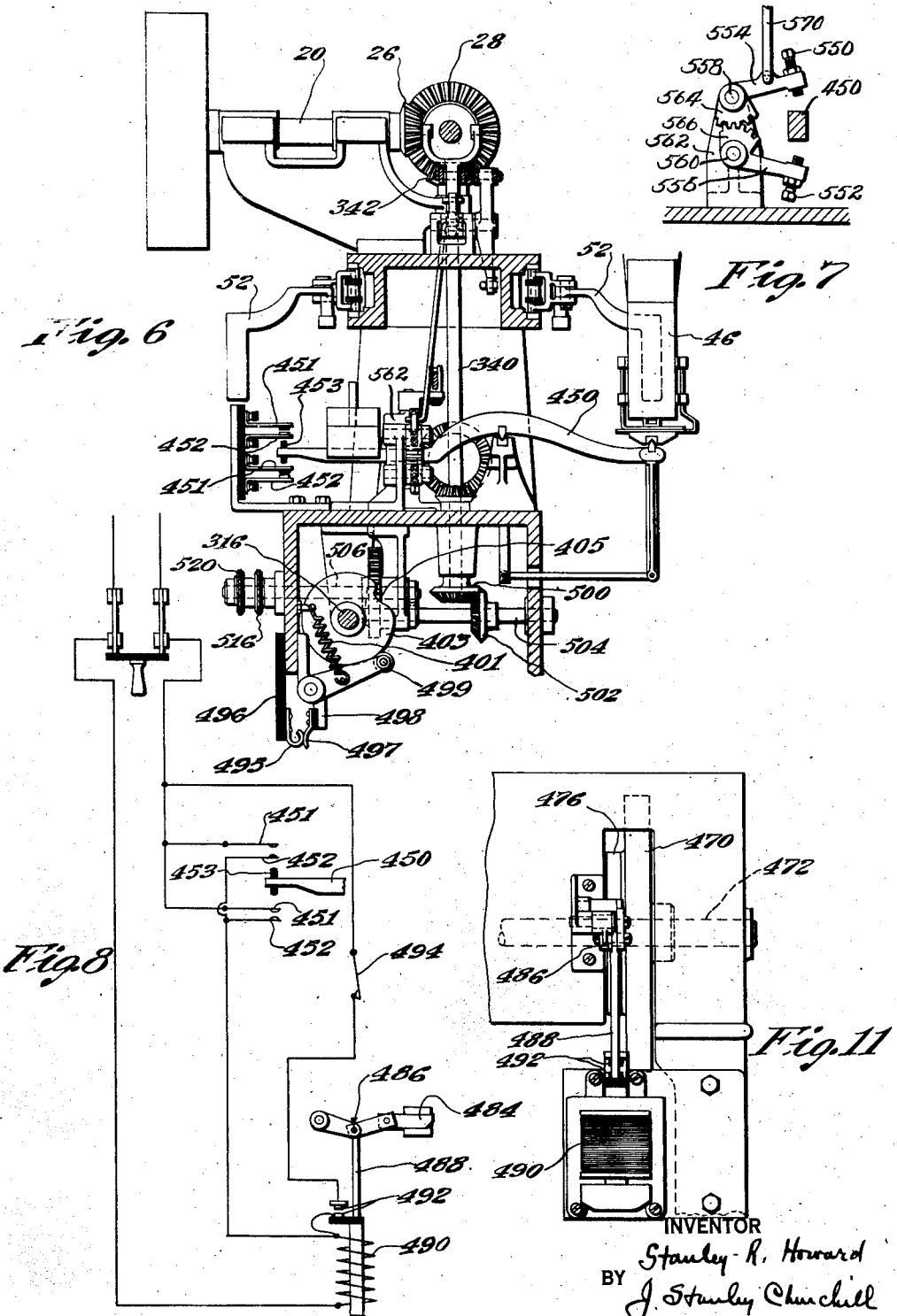
INVENTOR
Stanley R. Howard
BY J. Stanley Churchill
ATTORNEY May 10, 1938.  S. R. HOWARD  2,116,895
PACKAGING MACHINE
Filed Oct. 20, 1933  7 Sheets-Sheet 7
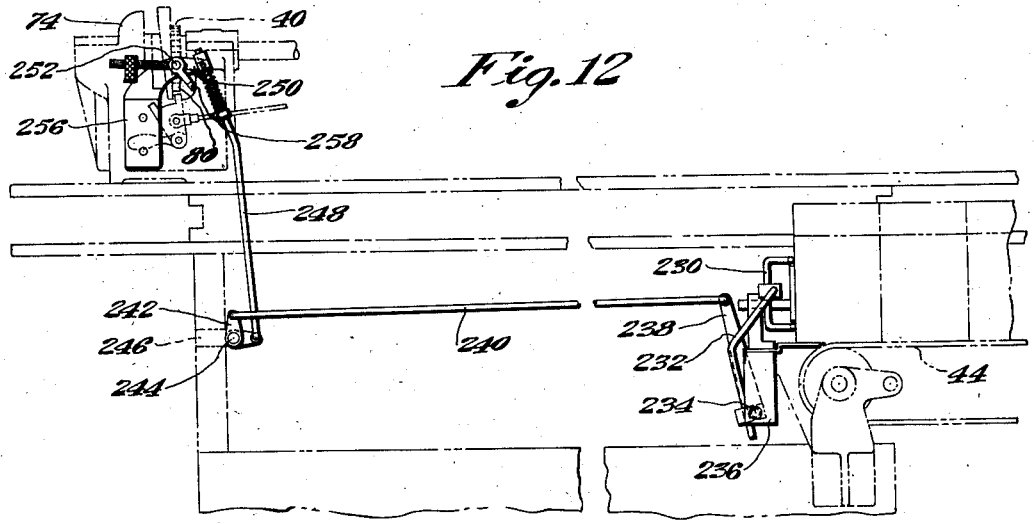
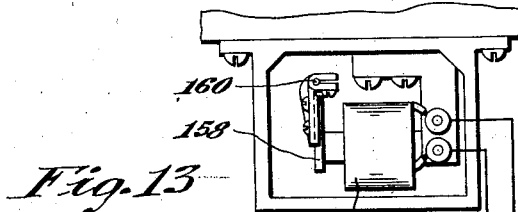
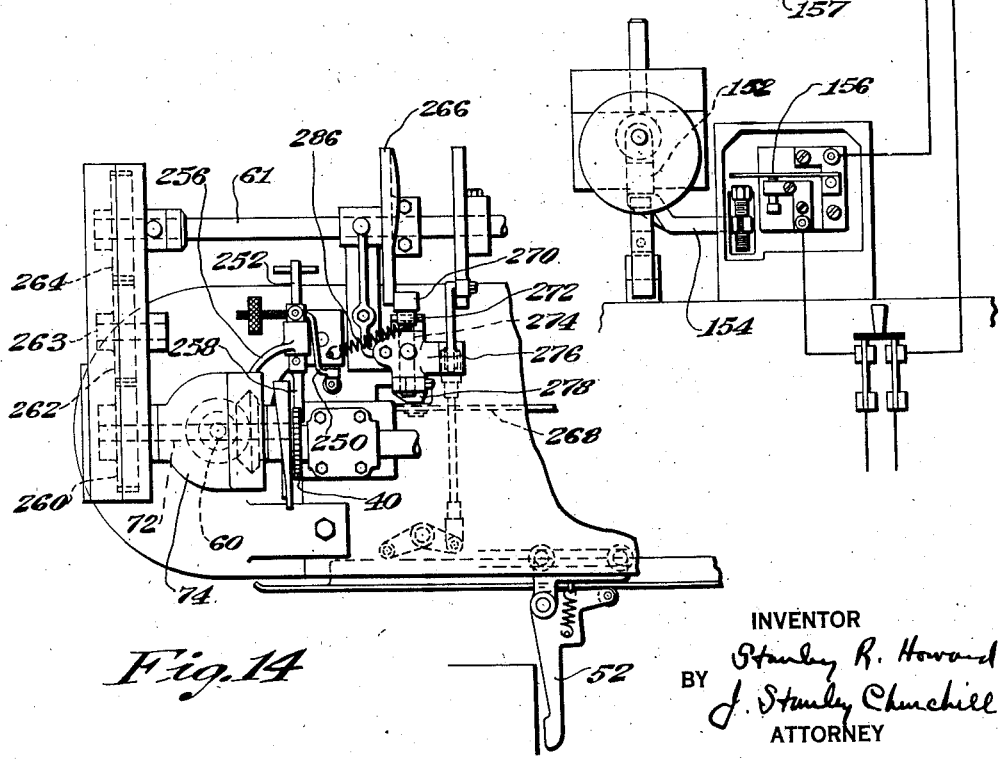
INVENTOR
Stanley R. Howard
BY J. Stanley Churchill.
ATTORNEY Patented May 10, 1938

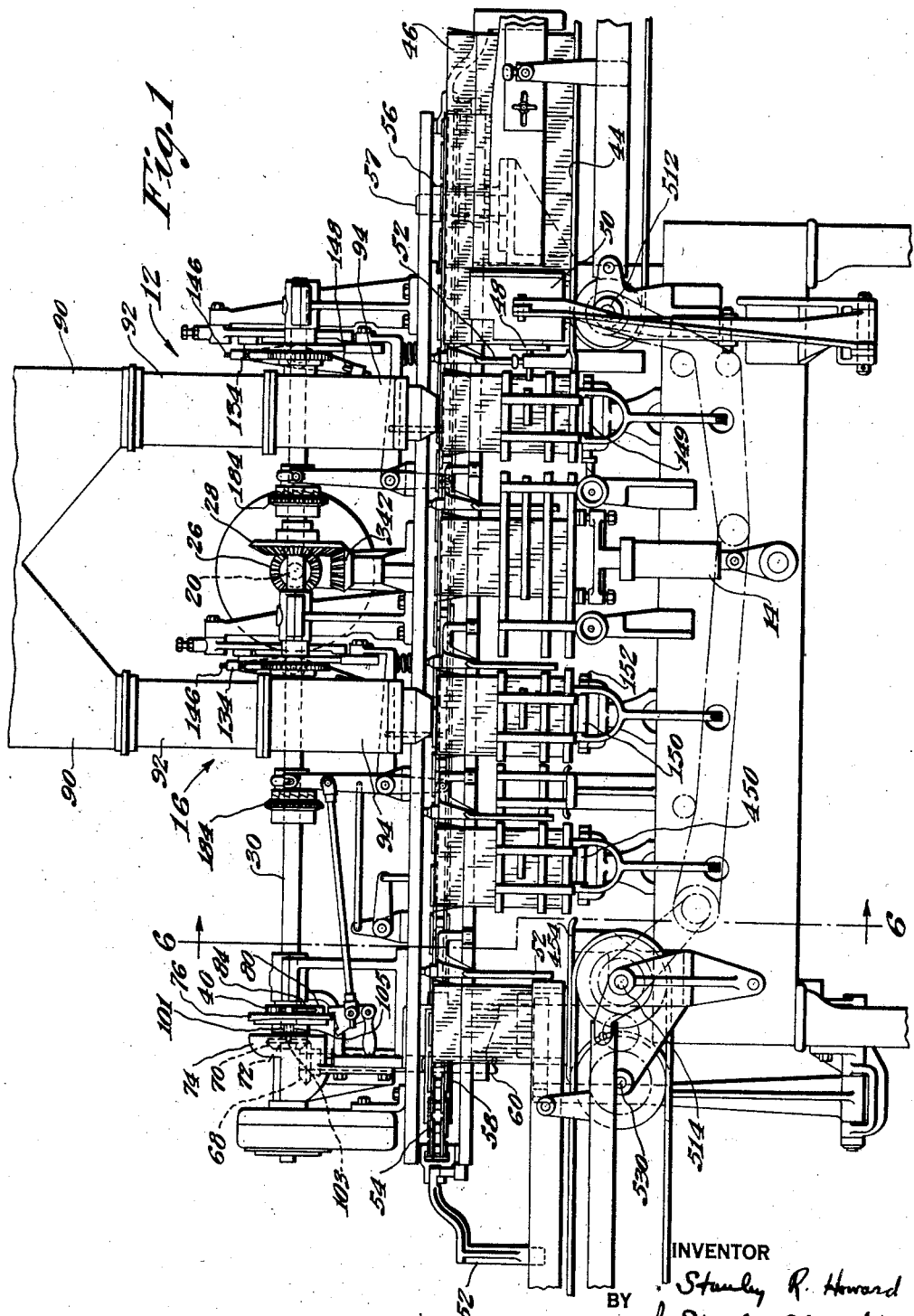

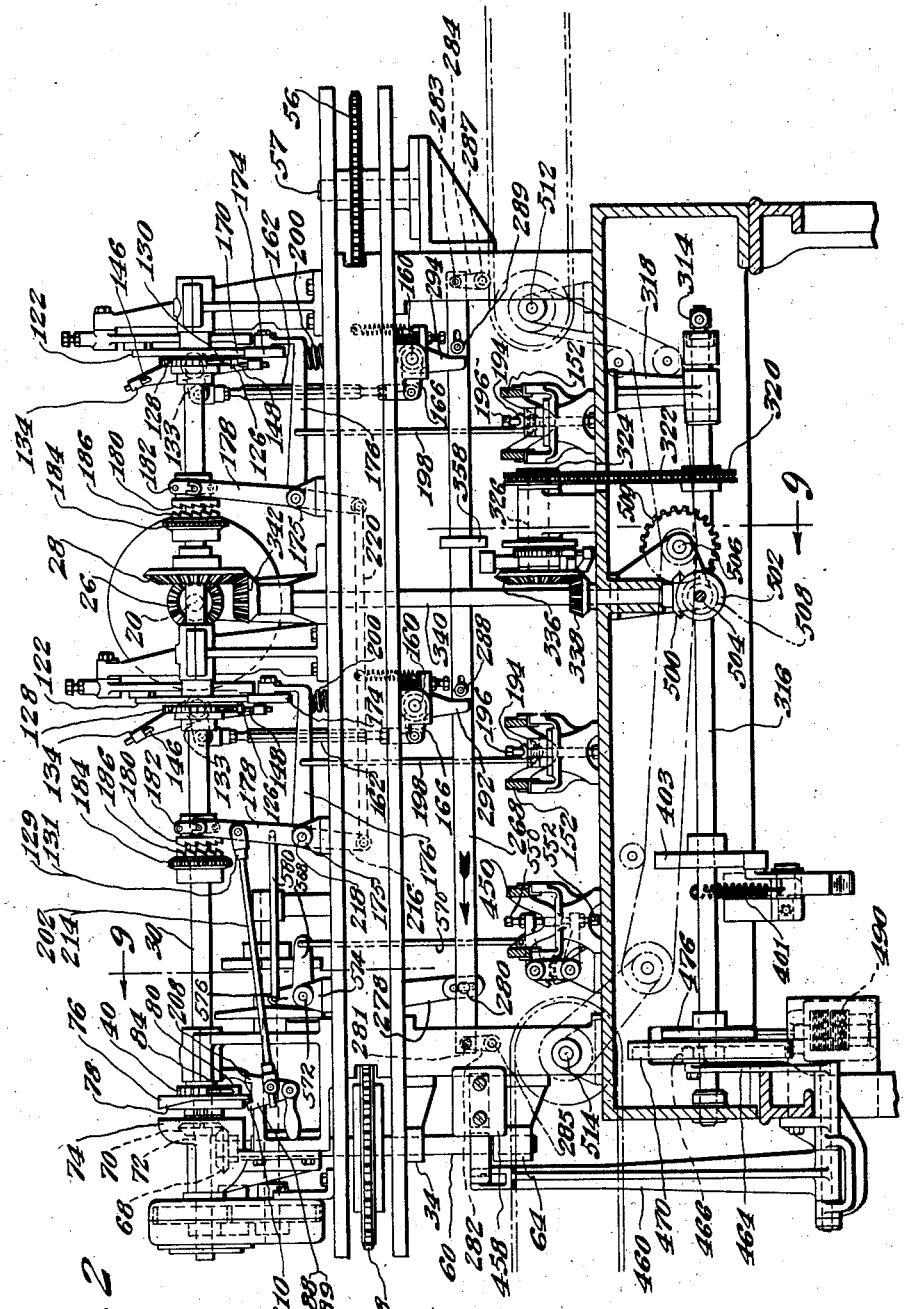

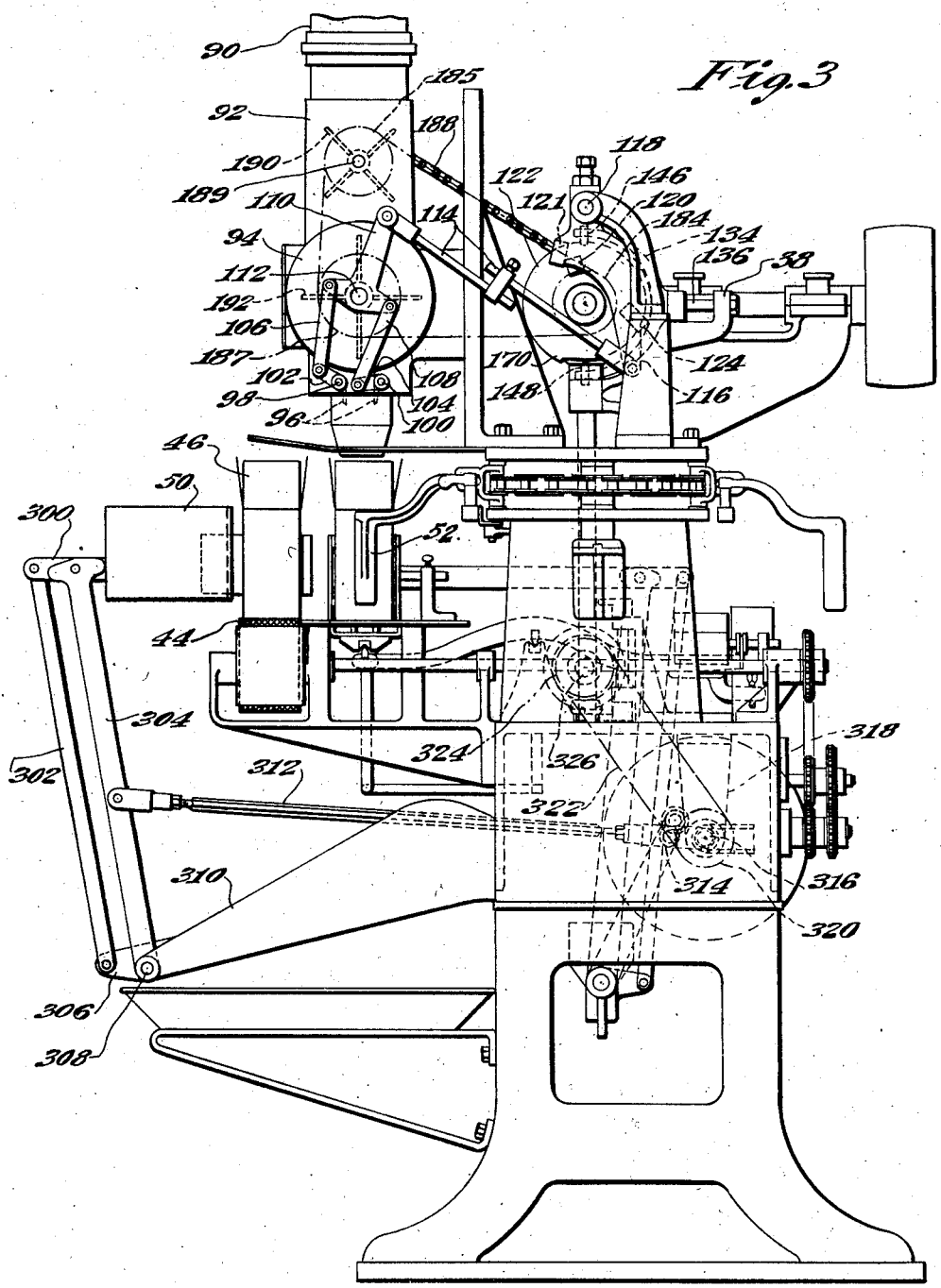

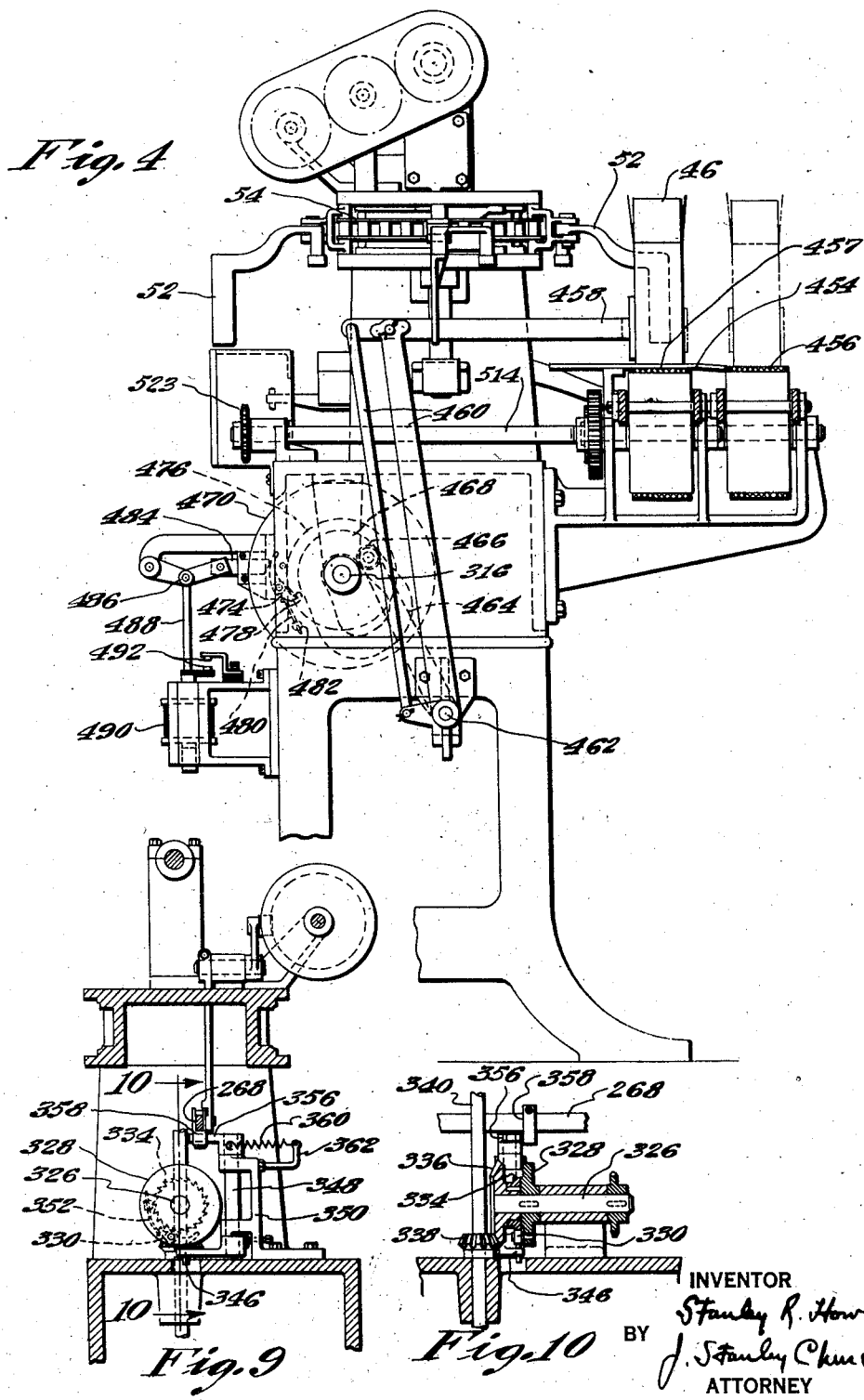

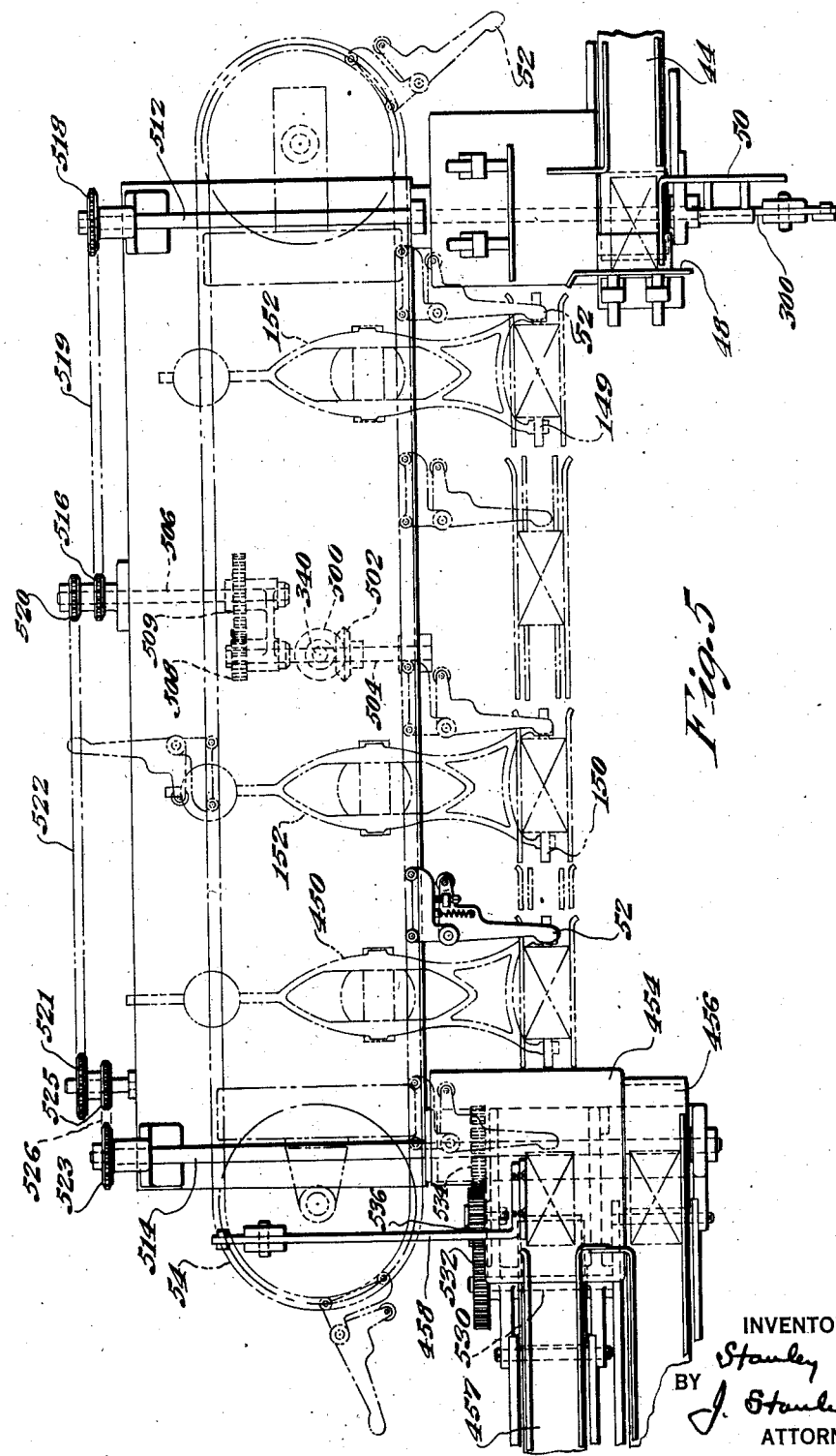

2,116,895

UNITED STATES PATENT OFFICE 2,116,895

PACKAGING MACHINE

Stanley R. Howard, Milton, Mass., assignor to Pneumatic Scale Corporation, Limited, Quincy, Mass., a corporation of Massachusetts Application October 20, 1933, Serial No. 694,417

11 Claims. (Cl. 249—59)

This invention relates to a packaging machine.

One object of the invention is to provide a novel packaging machine capable of checking the weights of filled packages and for selectively separating those packages whose weights vary from a predetermined standard.

A further object of the invention is to provide a novel automatic weighing machine capable of filling and weighing successive packages and of selectively separating those packages whose weights vary from a predetermined standard.

A still further and more specific object of the invention is to provide a novel automatic weighing machine embodying check weighing mechanism as an integral and unitary part thereof for filling and weighing successive packages and then selectively separating those packages whose weights vary from a predetermined standard.

With these objects in view and such others as may hereinafter appear, the invention consists in the automatic weighing machine and in the various structures, arrangements, and combinations of parts hereinafter described and particularly defined in the claims at the end of this specification.

In the drawings illustrating the preferred embodiment of the present invention, Fig. 1 is a front elevation of an automatic weighing machine embodying the present invention; Fig. 2 is a front elevation of the machine with portions omitted to show the mechanism for controlling the weighing operation; Fig. 3 is an end elevation of the weighing machine viewed from the right in Fig. 1; Fig. 4 is an end elevation of the machine viewed from the left in Fig. 1; Fig. 5 is a plan of the machine with portions omitted to show the conveying and discharge mechanism; Fig. 6 is a vertical sectional view taken on the line 6—6 of Fig. 1; Fig. 7 is a detail to be referred to; Fig. 8 is a wiring diagram to be referred to; Fig. 9 is a vertical sectional view taken on the line 9—9 of Fig. 2; Fig. 10 is a sectional view taken on the line 10—10 of Fig. 9; Fig. 11 is a detail in side elevation showing pawl actuating mechanism to be referred to; Fig. 12 is a front elevation of the machine with portions omitted to show a control device to be referred to; Fig. 13 is a wiring diagram to be referred to; and Fig. 14 is a detail in plan of the left hand portion of the machine illustrated in Fig. 1.

Referring now to the drawings, the invention is illustrated as embodied in an automatic weighing machine of the type known in the art as a two scale weigher. The machine illustrated is similar in construction and operation, excepting as hereinafter pointed out, to the machines illustrated in the patents to Stanley R. Howard No. 1,724,591, issued August 13, 1929, and William S. Cleaves No. 1,739,061, issued December 10, 1929, to which reference may be had.

In general, the machine illustrated in the drawings comprises a bulk loading mechanism 12 adapted to deliver to a carton positioned on a scale pan 149 located immediately beneath it a bulk load of material, and provision is made, as will be described, for moving the carton after it has received its bulk load onto an intermediate platform which may be referred to as a tapping mechanism which operates to shake down the bulk load to settle it into the carton after which the carton is advanced to a scale pan 150 of the final loading mechanism. The final loading mechanism comprises in part a drip hopper 16 which delivers a stream of material being weighed into the carton which has previously been supplied with the bulk load. When receiving the final load, a carton is positioned upon a scale pan 150 mounted upon the scale beam 152. After the carton has received its final load, provision is made, as will be described, for moving the carton onto a check weighing platform which operates to check weigh the carton, and in accordance with the preferred form of the present invention, provision is made for controlling the disposition of the cartons as they are discharged from the check weighing scale according to variations in the weights of the cartons from a predetermined value so that those cartons which are of a predetermined weight are discharged in a normal manner from the machine and those cartons which vary either above or below the predetermined weight are discharged in a separate path to be segregated together.

As herein shown, the empty cartons 46 are fed into the machine by a constantly driven inlet conveyor 44 until the foremost carton thereon engages a fixed stop 48 and a pusher plate 50 is arranged to thereafter engage the first carton on the inlet conveyor and push it into a position where it may be engaged by a pusher arm 52 on an endless driven chain 54 and moved beneath the bulk loading hopper and upon the scale pan 149. The pusher plate 50 is arranged to operate in timed relation to the series of pusher arms 52 on the conveyor chain 54 which intermittently feed the cartons in succession first to the bulk loading mechanism, then to the tapping mechanism 14, then to the scale pan 150 of the final loading mechanism, and then onto the check weighing scale. Finally, after the carton has been check weighed, it is controllably discharged from the machine in one of a plurality of paths according to whether or not it varies from a predetermined weight, those cartons which do not vary in weight from the prescribed limits being discharged in one path and the cartons which vary from said prescribed limits being discharged in another path.

As above stated, in general, the construction of the illustrated weighing machine comprises that of the known automatic weighing machine commonly referred to as a two scale weigher such as is illustrated in the patent to Scales, No. 924,191, issued June 8, 1909. For an understanding of the operation of such weighing machine, it may be stated that the weighing machine operates in successive cycles. During the first part of each cycle in the operation of the machine, the loading, tapping, and weighing operations described take place. After the cartons on the scale pans have received their weight, the second part of the cycle is permitted to begin and the feeding mechanism is actuated to advance a carton to a position previously occupied by the preceding one. In the machine illustrating the preferred embodiments of the invention, a fresh carton is fed into a position under the bulk loading mechanism and the carton with its bulk load is fed onto the final weight scale beam and the carton previously on the final weight scale beam is fed onto the check weighing scale and the completely weighed carton is fed from the check weighing scale onto one of a plurality of discharge conveyors according to whether the weight of the carton is within or without the prescribed limits.

The driving power necessary to operate various mechanisms hereinafter described is obtained from a continuously rotated main driving shaft 30 through clutch mechanisms which are engaged and disengaged at the proper time in the operation of the machine, as will be described. The main driving shaft 30 is rotated from any suitable source of power such as an electric motor, not shown, through a driving shaft 20 mounted in suitable bearings formed in the machine frame, cooperating bevel gears 26, 28 mounted on the respective shafts 20, 30 and suitable connections with the source of power.

Provision is made for moving the cartons to the successive stations during the operation of the machine and, as shown in Fig. 1, a plurality of carrier fingers 52 are attached to a chain 54 which runs around an idler sprocket 56 on a stud 57 journalled in suitable bearings formed in the machine frame and around a driving sprocket 58 which is securely fastened to a vertical shaft 60 rotatably supported in bearings formed in brackets 34, 64. The vertical shaft 60 is adapted to be driven from the main driving shaft 30 through a shaft 72 which is rotatably mounted in a bracket 74. The shaft 72 is connected to the shaft 60 by cooperating bevel gears 68, 70 fast on the shafts 60, 72, respectively, and is slightly offset from the main driving shaft in order to provide a slow start and stop so that the carton moving mechanism will start and stop gradually. A clutch mechanism is provided for controlling the rotation of the shaft 72 and, as herein shown, comprises a disc 76 mounted free on the shaft 30, a pawl 80 mounted on said disc and a ratchet wheel 40 fast on the main driving shaft 30. A spring 84 attached to the face of the disc 76 normally tends to urge the pawl 80 into contact with the teeth of the ratchet wheel 40. Provision is made for controlling the operation of the pawl 80 to engage and disengage it from the cooperating ratchet wheel 40 at the proper interval, as will be described. The shaft 72 is connected to the disc 76 through an anti-friction roller 101 mounted on a pin 103 formed in the bevel gear 70 and which projects into a radial slot 105 formed in the face of the disc 76.

The loading and weighing mechanism used in the illustrated weighing machine will now be described. The bulk loading mechanism, as illustrated in Figs. 1 and 3, operates during the first half of each cycle to deliver a measured quantity of the material to be packed slightly less in amount than the final load which the carton is to receive into a carton which has been fed into position beneath said loading mechanism by the pusher arm 52 during the second half of the preceding cycle. The loading mechanisms comprise supply hoppers 90 which are provided with pipes 92 which guide the material to be weighed into feeding hoppers 94. In order to insure that the material to be weighed will flow freely through the supply tubes 92 into the feeding hoppers 94, provision is made for agitating the material and, as shown in Fig. 3, stirrers 190, 192 are mounted on shafts 189, 112 journalled in the supply tubes 92, and provision is made for rotating said stirrers at the proper speed during the first half of each cycle. To this end sprockets 185, 187 are secured to the shafts 189, 112 and chains 188 engage said sprockets and sprockets 184 which are loosely mounted upon the continuously rotated shaft 30. The sprocket wheels 184 are the driven member of a clutch and provision is made for rotating said sprocket wheels to operate the stirrers. For this purpose the sprocket wheels 184 are provided with teeth 186 cut in one face thereof and arranged to engage with teeth 180 cut in the face of cooperating collars 182 slidably keyed to the shaft 30 and rotating therewith. Provision is made for moving the driving clutch members 182 during the weighing portion of each cycle in the operation of the machine into engagement with the sprocket wheels 184, as will be described. The feeding hoppers 94 are provided with shutters 96 arranged to be opened and closed at the proper time in the operation of the machine, as will now be described. The shutters 96 are secured to rock shafts 98, 100 journalled in the hoppers 94 and are operatively connected with rocking levers 110 loosely mounted on the stirrer shafts 112 through arms 102, 104 and links 106, 108. The rocking levers 110 are operated to open and close the shutters 96 through adjustable connecting rods 114, one end of which is pivotally mounted on one arm of the rocking levers 110 and the other end pivotally connected to rocking levers 116 which are frictionally mounted on pins 118. When the rocking levers 116 are in the position shown in Fig. 3, the shutters 96 will be in their open position, and when the rocking levers are moved to the left, the shutters 96 will be closed. The rocking levers 116 are operated by means of cam blocks 120 mounted on rotating discs 122 which cooperate with cam blocks 124 mounted on the rocking levers 116 during one-half of the revolution of the discs 122 to move the rocking levers 116 to the right, as viewed in Fig. 3, thus opening the shutters 96, and during the second half of the revolution of the discs 122 the cam blocks 120 contact with cam blocks 121 mounted on the rocking levers 116 to move said rocking levers to the left, as viewed in Fig. 3, and close the shutters 96. The discs 122 are loosely mounted upon the continuously rotated main driving shaft 30 of the machine and are the driven members of clutches. Provision is made for rotating said discs during the first part of each cycle in the operation of the machine and, as shown in Fig. 2, ratchet wheels 128 are mounted fast on the driving shaft 30 adjacent the discs 122. Pawls 126 are mounted on the face of the discs 122 adjacent the ratchet wheels 128 and are adapted to cooperate with the teeth thereof. The pawls 126 are normally urged into engagement with the teeth of the ratchet wheels by springs 130. Provision is made for holding the pawls 126 out of engagement with the teeth of the ratchet wheels 128 while the machine is operating on the weighing and carton moving parts of its cycle and, as shown in Figs. 1 and 3, yokes 134 which are mounted on pins 136 free to rock in bearings formed in arms of brackets 38 are provided with pins 146, 148 mounted in the ends thereof and adapted to engage the pawls 126 and hold them out of contact with the teeth of the ratchet wheels 128. The yokes are oscillated in a direction longitudinally of the main driving shaft 30 to present either the upper or lower pins 146, 148 in the path of the pawls 126 and hold them out of engagement with the teeth of the ratchet wheels 128.

During the carton filling operation of the machine, the pawls 126 are held out of engagement with the teeth of the ratchet wheels 128 by the pins 146, as shown in Fig. 1, and as the cartons make their weights, provision is made for disengaging the pawls 126 from the pins 146 in order to allow the discs 122 to be rotated and close the shutters 96. Accordingly, the yokes 134 are connected to rock shafts 160 by means of connecting rods 162 pivoted at one end to the outer end of levers 166 fast on the rock shafts 160 and pivoted at the other ends to arms 133 formed on the yokes 134, and provision is made for rocking the rock shafts 160 as the scale beams make their weights. As shown in Fig. 13, scale beams 152 are provided with arms 154 attached to the counterweight ends thereof and which are adapted to open switches 156 of electric circuits. The circuits in which the switches 156 are connected have included therein electro-magnets 157 having armatures 158 fast on the rock shafts 160. It will be seen that when the circuits are opened by the switches 156, the armatures of the electro-magnets will be freed, allowing the rock shafts 160 to be rocked by the springs 319 and thus through the connections described rock the yokes 134 and disengage the pawls 126 from the pins 146 and allow the discs 122 to rotate through one-half a revolution, at which point the pawls 126 will be engaged by the pins 148 and remain engaged until the said pins are moved out of the path of the pawls when the yokes are rocked in a reverse direction, as will be described. During the revolution of the discs 122 through their half revolution, the gates 96 will be closed by the cam, as previously described.

Provision is made for rotating the stirrers 190, 192 during the carton filling operation of the machine through the clutch members 182, 184, previously described. For this purpose the discs 122 are provided with cam surfaces 170 adapted to cooperate with cam rollers 174 mounted on arms 176 of bell crank levers 175 and move the clutch members 182 which are mounted on the second arms 178 of the bell crank levers into and out of engagement with the cooperating clutch members 184. The cam rollers 174 are maintained in contact with the cam surfaces 170 by springs 200 positioned as shown in Fig. 2. The cam surfaces 170 are designed so that the clutch members 182, 184 will be moved into engagement during the carton filling operation of the machine and will be out of engagement while the machine is operating on the carton moving portion of the cycle.

During the portion of each cycle of operation of the machine in which a carton is being moved onto the scale pans, the scale beams 152 are locked by set screws 196 mounted in levers 194, the latter being held down by the cams 170 through the cam rollers 174, bell crank arms 176, and connecting rods 198, as illustrated in Fig. 2.

Provision is made for controlling the machine so that it will not start the second part of its cycle of operation until the load scales have completed their weights. For this purpose, the arms 178 of the bell crank levers 175 of the loading mechanism are connected to pawl controlling latches, the arm of the bell crank lever of the final loading mechanism being directly connected to a pawl controlling latch 88 by a link 202 and the arm 178 of the bell crank lever 175 of the primary loading mechanism being connected to a pawl controlling latch 89 by a link 220 attached to the extended arm of the bell crank lever 178 at one end and at the other end to an arm lever 216 which is freely mounted on a pin 218 and has the other end thereof connected by a connecting rod 214 to the pawl controlling latch 89. The pawl controlling latches 88, 89 are arranged to cooperate with the pawl 80 of the pawl and ratchet clutch 80, 40, the ratchet wheel 40 being fast on the main driving shaft 30 and the pawl 80 being mounted on a pawl carrying disc 76 secured to a separate shaft 72, as previously described. The pawl controlling latches 88, 89 are provided with pawl engaging projections 208 for holding the pawl 80 out of engagement with the ratchet 40 and a recessed portion adapted to permit the free rotation of the pawl without disengaging it from the ratchet. In order that the pawl engaging projections 208 may be moved back into the path of travel of the pawl 80 independently of the movement of the arms 178 of the bell crank levers of the primary and final loading mechanism to disengage it from the ratchet 40 when the pawl has made one revolution, the ends of connecting rods 202, 214 are provided with slip joint connections 129, 131 and one face of the pawl carrying disc 76 is provided with a cam surface 78 which is arranged to engage with projections 210 on the pawl stops 88, 89 to move the pawl stopping projections 208 into the path of travel of the pawl 80 and disengage the pawl after it has made one complete revolution. The pawl stops 88, 89, the slip joint connections 129, 131, and the connecting rods 202, 214 are alike in construction and located one in the rear of the other, as will be apparent from an inspection of Fig. 2. The slip joint connections 129, 131 comprise forks provided with the usual friction plugs, not shown, which bear against the rods 202, 214 with sufficient pressure to withdraw the pawl stops 88, 89, from engagement with the pawl 80, without slipping. However, the rods are permitted to slip in the forks when the cam surface 78 strikes the lug 210 on the pawl stops 88, 89 to rock the pawl stops back into engaging position with the pawl 80, while the levers 178 remain in the non-weighing position, as illustrated in Fig. 2. The shaft 72 is connected to the vertical shaft 60, as previously described, and consequently it will be seen that the movement of the carton at the start of the second part of each cycle of operation of the machine cannot take place unless the pawl controlling latches 88, 89 are in their inoperative positions or, in other words, swung to the right from the position shown in Fig. 1 to permit the pawl 80 to engage the ratchet 40. This condition, as will be observed, is only obtained when both the primary and final weighing scales have completed their weights and have been reset, as will be described.

As above stated, the operation of the weighing machine takes place in successive half cycles in which cam discs 122 are permitted to make one-half a revolution, accordingly as the pins 146, 148 upon the yokes 134 are moved to successively engage the tails of the pawls 126 as the yokes are rocked into their two positions of operation. The movement of the carton by the pusher arms 52 occurs during one-half of each cycle and the weighing operation occurs during the remaining half of each cycle. The manner in which the yokes 134 are rocked to disengage the pins 146 from the pawls 126 and allow the discs 122 to be rotated through one-half a revolution as the scale beams make their weights, at which point the pawls 126 are engaged by the pins 148, has been previously described. During the time the pawls 126 are engaged by the pins 148 the machine operates on a carton moving portion of its cycle.

Provision is made for rocking the yokes 134 in order to disengage the pins 148 from the pawls 126 and allow the machine to start on the weighing portion of its cycle at the end of the carton moving portion of the cycle, and, as shown in Figs. 2 and 14, this is accomplished by the resetting mechanism which will now be described. A shaft 61 mounted in suitable bearings formed in the frame of the machine adjacent the shaft 72 is driven therefrom by gears 260, 264 fast on the shafts 72, 61, respectively, through an idler gear 262 mounted free on a stud 263. A cam 266 fast on the shaft 61 is arranged to move a resetting bar 268 in the direction shown by the arrow in Fig. 2. Accordingly, a cam roll 270 adapted to cooperate with the cam 266 is carried by a lever 272 secured to one end of a pin 274 which is mounted in a bracket 276 and has mounted fast on the other end thereof a lever 278 which is attached to the resetting bar 268. An elongated slot formed in the lever 278 cooperates with a stud 280 fast on the resetting bar 268, thus providing a slidable connection. The resetting bar is mounted for reciprocation and is supported by pins 281, 283 formed on the ends of levers 282, 284 which are mounted free to rock on studs 285, 287. The cam roll 270 is maintained in contact with the cam 266 by means of a spring 286. The resetting bar is provided with pins 288, 289 adapted to contact with arms 292, 294 which are mounted on the rock shafts 160.

From the above description, it will be seen that as the carton conveying mechanism is operated, the resetting mechanism will also be actuated through the mechanism above described to rock the rock shafts 160 and that the yokes 134 will be moved in a clockwise direction through the connections previously described, thus positioning the pins 146 in a position to engage the pawls 126 after the discs 122 have made one-half a revolution.

Provision is made for pushing the cartons from an incoming conveyor belt 44 into a position to be engaged by the carrier fingers 52 and, as illustrated in Fig. 3, a carton pusher 50 is mounted on a bar 300 which is pivotally supported by outer and inner links 302, 304, respectively. The link 302 is pivotally connected to an extension 306 of the bracket 310. The lower end of the link 304 is freely mounted on a stud 308 and, as will be seen from Fig. 3, the linkage above described allows the carton pusher 50 to be operated in a substantially horizontal plane. A connecting rod 312 is pivotally connected at one end to the arm 304 and has the other end attached to a crank 314 fast on a shaft 316 which is mounted in suitable bearings 318 in the machine frame. The shaft 316 is provided with a sprocket 320 thereon and is driven from a sprocket 324 fast on a shaft 326 by a chain 322. Provision is made for rotating the shaft 326 to operate the carton pushing mechanism during the last part of the carton moving cycle of operation. To this end the shaft 326 is provided with a pawl and ratchet clutch, as illustrated in Figs. 2, 9 and 10. A disc 328 mounted fast on the shaft 326 carries a pawl 330 which is adapted to cooperate with a ratchet 334 formed integral with a bevel gear 336 and which is mounted free to rotate on the shaft 326. The bevel gear 336 is driven from a bevel gear 338 fast on the vertical shaft 340 driven through a bevel gear 342 fast on one end of a shaft 340 and a cooperating bevel gear 28 fast on the shaft 30. The pawl 330 is normally urged into engagement with a ratchet 334 by means of a spring 352 attached to the disc 328. As shown in Fig. 9, a pawl stop 346 mounted on a shaft 348 supported in a bracket 350 attached to the machine frame is arranged to be moved into and out of the path of travel of the pawl 330 to thereby disengage the said pawl from the ratchet 334. The shaft 348 is provided with an arm 356 fast on the top thereof and which projects into the path of travel of an adjustable pin 358 on the resetting bar 268. The arm 356 is positioned so that the pawl stop 346 is moved out of engagement with the pawl 330 when the resetting bar 268 is moved to the left, as viewed in Fig. 2, and which occurs at the end of the carton moving cycle in the operation of the machine, as has been previously described. A spring 360 attached at one end to the arm 356 and at the other end to a spring hook 362 fast in the bracket 350 is arranged to return the pawl stop 346 into the path of the pawl arm 330 in order that the pawl arm will be disengaged from the ratchet 334 after it and, consequently, the shaft 326 has made one revolution.

Provision is made for controlling the operation of the machine so that after the weighing and filling operation takes place, the carton moving mechanism will not be allowed to operate unless there is a carton in position against a finger 230 and, accordingly, provision is made for holding the pawl 80 out of engagement with the teeth of the ratchet wheel 40, as is illustrated in Fig. 12. Accordingly, the finger 230 is mounted on the end of an arm 232 fast on a rod 234 which is free to rock in bearings formed in a bracket 236 attached to the frame of the machine. An arm 238 also fast on the rod 234 is connected by a connecting rod 240 to an arm of a bell crank 242 freely mounted on a stud 244 supported in a bracket 246 and the other arm of the bell crank lever 242 is yieldingly connected by a connecting rod 248 to an arm 250 fast on a shaft 252 supported in bearings in a bracket 256 which is attached to a bracket 74. A pawl stop 258 fast on the shaft 252 and normally positioned in the path of travel of the pawl 80 is adapted to be moved out of said path when a carton is present against the finger 230, thus allowing the pawl 80 to engage the teeth of the ratchet wheel 40. When there is no carton present against the finger 230, it will be seen that the pawl stop 258 remains in the path of travel of the pawl 80, thus preventing the next cycle in the operation of the machine from starting.

Provision is made for driving both the incoming and outgoing conveyors and, as herein shown, driving connections are provided between the main driving shaft 30 above referred to and the driving pulleys of both conveyors. These driving connections include the vertical shaft 340 (see Figs. 2, 5, and 6) upon the lower end of which is provided a bevel gear 500 arranged to cooperate with a bevel gear 502 on the cross shaft 504 whose rotations are transmitted to a second cross shaft 506 through a pair of gears 508, 509. The rotations of the shaft 506 are transmitted to the cross shafts 512, 514 of the incoming and outgoing conveyors, respectively, by sprockets 516, 518 and a chain 519 and also by a second pair of sprockets 520, 521 and their cooperating chain 522, as clearly illustrated in Fig. 5. The outgoing conveyor cross shaft 514 is connected to the sprocket 521 through an additional pair of sprockets 523, 525 and chain 526, the sprocket 525 being attached to the hub of the sprocket 521. The driving pulley for the incoming belt 44 is mounted upon the cross shaft 512 and the driving pulley for the main outgoing belt 456 is mounted upon the end of the cross shaft 514. Provision is made for driving the auxiliary outgoing belt 457. For this purpose its driving pulley is mounted upon a countershaft 530 driven from the cross shaft 514 through gears 532, 534 and an idler gear 536.

From the description thus far, it will be observed that the shaft 316 operates the package pusher for removing the packages 46 from the incoming conveyor 44 and for depositing said packages in advance of the carrier fingers 52 of the main conveyor by which the packages are intermittently moved through the filling, tapping and weighing stations, as above described. During the operation of the machine, after each package has been filled and weighed it is moved by the carrier fingers 52 onto the platform or weighing end of a check weighing scale 450.

The scale locking mechanism for the check weighing scale, see Figs. 2, 6 and 7, is operated in a manner similar to the bulk and final load weighing scales with this exception, that duplicate set screws 550, 552 are employed so that the scale beam 450 is free to move either up or down according to the weight of the package, when the scale beam is unlocked. As herein shown, the locking mechanism comprises duplicate arms 554, 556, provided with the set screws 550, 552, and pivoted at 558, 560, respectively in a bracket 562, mounted on the machine frame. The duplicate arms are geared together to operate simultaneously by segments 564, 566, formed integral with the duplicate arms. The upper arm 554 is connected to one arm 568 of a bell crank by a connecting rod 570. The bell crank pivoted at 572 in a bracket 574 mounted on the machine frame is provided with a second arm 576 which is connected to the arm 178 by a connecting rod 580. During the portion of each cycle, in the operation of the machine, in which the cartons are being moved, the scale beam 450 is locked by the cam 170, see Fig. 2, which rocks the lever 176 downwardly through the cam roll 174, thereby rocking the lever 178 to the right and through the linkage described, locks the check weighing scale beam 450. After the carton has been positioned, the set screws 550, 552 are rocked away from the check weighing scale beam by the spring 200 under the lever 176, preparatory to the start of the check weighing operation.

Referring now to Fig. 6, in accordance with the preferred form of the present invention, provision is made for controlling the disposition of the packages as they are discharged from the check weighing scale according to variations in the weights of the packages from a predetermined value, preferably so that those packages which are of a predetermined weight are discharged in a normal manner from the machine upon the main outgoing conveyor belt 456 and those packages which vary either above or below the predetermined weight are discharged in a separate path to be segregated together upon an auxiliary outgoing belt 457. As shown in Fig. 6, the extreme end of the scale beam of the check weighing scale 450 is arranged to oscillate between two pairs of spring contacts 451, 452 and a contact pin 453, preferably of insulated material, is mounted upon the end of the scale beam to engage with the adjacent spring members of the spring contacts 451, 452, respectively, accordingly as the end of the scale beam is raised or lowered under the influence of an abnormally heavy or light package.

Referring now to Figs. 4 and 8, during the operation of the machine after each package has been check weighed, the carrier fingers 52 advance the package 46 to remove it from the check weighing scale 450 and deposit it upon a receiving plate or platform 454. Provision is then made for moving the package from the platform onto a discharge belt 456 in the event that the check weighing scale has indicated that the weight of the package does not vary from the predetermined amount or, in other words, is correct within predetermined limits, and, as illustrated in Fig. 4, this is accomplished by means of a package pusher 458 which operates to push the package from the full to the dotted line position shown in Fig. 4, thereby depositing the package upon the outgoing belt 456 by which the packages are discharged in succession from the machine in the normal manner. The operation of the package pusher is such that unless its operation is interrupted by control mechanism responsive to an indication of either an over or an underweight by the check weighing scale, the package pusher continually reciprocates to move successive packages onto the outgoing belt 456. The package pusher is connected by parallel linkage 460 to a shaft 462 upon which is mounted a cam arm 464 carrying a cam roll 466 received within the closed half 468 of a cam 470 so as to give substantially a straight-lined motion to the package pusher. The cam is mounted free upon a cam shaft 316 and connection is made to the shaft through a pawl 474 mounted upon the cam and a driving disc 476 secured to the cam shaft 316. The driving disc 476 is provided with a notch 478 which engages the pawl 474 and operates to drive the cam 470 from the cam shaft 316 during normal operation. The nose of the pawl 474 is yieldingly held against the driving disc 476 so as to hold the pawl in the notch 478 by a leaf spring 480, one end of which is secured in a split stud 482 secured to the back of the cam.

Provision is made for disengaging the nose of the pawl 474 from the notch 478 in the disc 476 when the check weighing scale 450 has indicated that a package is either over or underweight and, as herein shown, a pawl stop 484 arranged to slide in suitable guides in a bracket forming part of the machine frame is moved inwardly into a position to engage the tail of the pawl and effect the desired movement of the pawl into an inoperative position, by a toggle 486 actuated by a connecting rod 488 forming part of the armature of a magnet 490. Referring now to Fig. 8, the two pairs of spring contacts 451, 452 are connected in parallel in the main circuit from the source of supply leading to the energizing coil of the magnet 490 so that when either pair of spring contacts 451, 452 are closed by the contact member 453 upon the end of the scale beam 450, in the event that the scale indicates an overweight or an underweight package, the magnet 490 will be energized and will operate to lift the armature and through the connecting rod 488 to straighten the toggle and move the pawl stop 484 into a position to engage the tail of the pawl 474. In this manner the package pusher 458 is prevented from operating and as a result the underweight or overweight package is pushed by the carrier fingers 52 onto the auxiliary outgoing belt 457 to be conveyed from the machine in a path separate from the main discharge of correct weight packages.

In order to prevent the operating circuit by which the coil of the magnet 490 is energized from opening immediately after it has been closed at the pairs of spring contacts 451, 452, as might be the case in the event of vibration or oscillation of the end of the scale beam, or in the event that an operator unintentionally disturbs the scale beam, provision is made for establishing a circuit around the spring contacts 451, 452 which is arranged to remain closed until it is subsequently opened at a predetermined time in the cycle of operation of the machine. As illustrated in Fig. 8, the shunt circuit includes a pair of contacts 492, one of which is secured to the armature of the magnet 490 and moves with it so that when the main operating circuit is closed at the pairs of spring contacts 451, 452 and the coil of the magnet energized, the shunt circuit will be closed at the contacts 492 upon upward movement of the armature of the magnet and this shunt circuit will remain closed and operate to hold the pawl stop in the path of the tail of the pawl until such time in the operation of the machine as the shunt circuit is mechanically opened by the switch indicated generally at 494. The switch 494, as best shown in Fig. 6, comprises a stationary spring member 495 mounted upon an insulating piece 496 depending from a bracket forming a part of the machine frame and also a movable spring contact 497 secured to and insulated from an arm 498 comprising one arm of a bell crank, the second arm of which is provided with a cam roller 499 which is yieldingly held by a spring 401 against a cam 403. The cam is mounted upon the shaft 316 and is so designed that during a portion of each cycle in the operation of the machine subsequent to the start of the weighing operation, the cam roller will ride on the high part of the cam and hold the switch 494 closed, and during the initial portion of the cycle of operation and before the weighing operation starts, the recess 405 in the cam permits the movable member 497 of the switch 494 to open the switch, thereby deenergizing the coil of the magnet 490 and opening the contacts 492. Immediately thereafter the switch 494 is closed and the contacts 492 remain open until subsequently closed upon the indication of either an overweight or an underweight, as above described.

From the description thus far, it will be observed that the pusher 50 for the incoming packages and the pusher 458 for the outgoing packages are both actuated from the pusher shaft 316 and, as herein described, this shaft is arranged to start its revolution during the latter portion of the package carrying cycle of operation of the weighing machine and continues during a portion of the weighing cycle. However, the cam 470 for the outgoing pusher 458 is so designed that the pusher will remain idle during the first half of the revolution of the shaft 316 to allow the package previously on the check scale 450, which has just been check weighed, time enough to arrive at the pusher station and come to rest. During the remaining half of the revolution of the shaft 316 the package is pushed across to the outgoing belt 456 in the normal operation of the machine. On the other hand, if the succeeding package, which has by this time arrived at the check scale, indicates a variation from the normal weight the pawl stop 484 is arranged as above described, to be pushed into position to disengage the pawl 474 from the notch in the disc 476 and, consequently, prevents the pusher 458 from operating. As there is only one notch 478 cut in the disc 476 and as the disc is fixed to the shaft 316, it will be apparent that after the shaft 316 has started its revolution the disc cannot be engaged by the pawl 474 until the next cycle of the operation of the machine. It will also be clear that the circuit shown in Fig. 8 which holds the pawl out of engagement with the disc can be broken by the switch 494 at any time after the shaft 316 has started and before the succeeding package arrives at the check scale to be check weighed. It will therefore be seen that the present device as shown is operative to act on any series of normal or abnormal weight packages and to either push the same to the outgoing conveyor 456 or allow the package to be carried along to the conveyor 457 by the package pusher 52 as indicated by the check scale.

In the operation of the machine, the empty cartons are placed on the incoming conveyor 44 where they are carried along until the foremost carton reaches the fixed stop 48. The carton is then pushed by the pusher 50 into the path of the intermittently operated carrier fingers 52 which advance the carton to the bulk loading scale 149. After receiving its bulk load, the carton is advanced to the tapping mechanism 14 and thence to the final loading scale 150. After receiving its final load the carton is advanced to the check weighing scale 450. The carton is then advanced to the platform 454 in front of the pusher 458 where the carton is disposed of according to the result of the check weighing. If the package is of abnormal weight, the pusher 458 is rendered inoperative and the carton is permitted to proceed to the outgoing conveyor belt 457 during the next movement of the carrier fingers 52. If the package is of normal weight the package pusher 458 pushes the package onto the outgoing belt 456 by which the packages are discharged in succession from the machine.

The operation of the machine is controlled by the weighing scales, and in each complete cycle of the machine the weighing operation takes place and then the package moving operation.

The sequence of events during the weighing operation may be summarized as follows. When the package comes to rest on a weighing scale, the last operation performed during the previous cycle is to set the weighing mechanism in operation by the cam 266 which, through the mechanism described, resets the armature 158 and rocks the yoke 134. This operation permits the disc 122 to revolve one-half revolution which sets the stirrers 190, 192 in motion, unlocks the scale beams 152, 450 and opens the shutters 96 in the hoppers 94. Upon receiving its required weight, each scale beam 152, operating independently, overbalances and opens its armature circuit at 156, whereupon the armature shaft 160 is rocked and consequently the yoke 134 is rocked to permit the disc 122 to make its second one-half revolution. During this one-half revolution, the above described operations are reversed, that is, the shutters 96 are closed, the stirrers 190, 192 are stopped and the scale beams are locked. Although the primary load scale and the secondary load scale are operated independently, it will be seen that the check weighing scale 450 is locked and unlocked through connections from the secondary scale. Simultaneously with the above described operations, each individual weighing scale operates to withdraw its pawl stop 88, 89 through the linkages described so that the package moving cycle of operations is initiated. The sequence of events during the package moving operation is briefly described as follows. With the pawl 80 in engagement with the ratchet 40 the sprocket 58 is rotated through the bevel gears 68, 70 thereby moving the carrier fingers 52 forward one station. The cam shaft 61 is set in motion through the gearing described, and through the cam 266 the resetting bar 268 is moved to the left, viewing Fig. 2, which disengages the pawl stop 346 to actuate the package pushers 50, 458, resets the armature 158 and rocks the yoke 134 to permit the weighing operation to be performed again. The above described cycle of operations contemplates normal operating conditions. However, should one of the packages on the check weighing scale 450 indicate a variation from the predetermined amount, either underweight or overweight, the package pusher 458 would be rendered inoperative through the connections disclosed in Figs. 6 and 8, and previously described, so that the abnormal packages will be segregated on a separate conveyor belt 457.

By the term "package" or "packages" as used throughout the specification and claims, I intend to include packages, cartons, cans, and other receptacles, and while the preferred embodiment of the present invention has been herein illustrated and described, it will be understood that the invention may be embodied in other forms within the scope of the following claims.

Having thus described the invention, what is claimed is:—

1. In an automatic weighing machine, in combination, mechanism for filling successive packages with flowable solid material including a weighing device, a check weighing scale, locking means therefor, said locking means being operative to return the scale to initial weighing position after each weighing operation, package moving means, connections between the filling mechanism and the aforesaid locking means for controlling the operation of the latter from the former, means for preventing movement of the package until the package filling mechanism and check weighing scale have completed their operation and the latter locked, assorting means controlled by said check weighing scale for separating from the packages being discharged those whose weights vary from a predetermined value, and means operatively connected with the package filling mechanism for initiating the operation of the assorting means in timed relation to the operation of the package filling mechanism whereby to effect the operation of the check weighing scale and assorting means automatically in synchronism with the cycle of operation of the package filling mechanism.

2. In a package filling machine for filling packages with flowable solid material, in combination, mechanism for filling successive packages, mechanism for checking the weights of the packages after they have been filled, locking mechanism therefor, said locking mechanism being operative to return the check weighing mechanism to initial weighing position after each weighing operation, package moving mechanism for moving successive packages to and from filling position and to and from check weighing position, means for controlling the operation of the locking mechanism from the filling mechanism, control mechanism for preventing the initiation of the operation of the package moving mechanism until the package filling and check weighing mechanism have completed their operation and the latter locked, assorting means controlled by said check weighing mechanism for separating packages whose weights are below a predetermined value from the packages being discharged, and means operatively connected with the package filling mechanism for initiating the operation of the assorting means in timed relation to the operation of the package filling mechanism whereby to effect the operation of the check weighing mechanism and assorting means automatically in synchronism with the cycle of operation of the package filling mechanism.

3. In a package filling machine for filling packages with flowable solid material, in combination, mechanism for filling successive packages, a check weighing device, locking means therefor, said locking means being operative to return the device to initial weighing position after each weighing operation, package moving means, connections between the filling mechanism and said scale locking means for controlling the operation of the scale locking means from the filling mechanism, means for preventing movement of the packages until the package filling mechanism and check weighing device have completed their operation and the latter locked, assorting means controlled by said check weighing device for separating packages whose weights are below a predetermined value from the packages being discharged, and means operatively connected with the package filling mechanism for initiating the operation of the assorting means in timed relation to the operation of the package filling mechanism whereby to effect the operation of the check weighing device and assorting means automatically in synchronism with the cycle of operation of the package filling mechanism.

4. The combination with mechanism for filling successive packages with flowable solid material, of a scale for checking the weights of the packages after they have been filled, locking means therefor, said locking means being operative to return the scale to initial weighing position after each weighing operation, package moving mechanism for moving successive packages to and from filling position and to and from check weighing position, means for controlling the operation of the check weighing scale locking means from the package filling mechanism, control mechanism for preventing the initiation of the operation of the package moving mechanism until the package filling mechanism and check weighing scale have completed their operation and the scale has been locked, assorting means controlled by said check weighing scale for separating from the packages being discharged those whose weights vary from a predetermined value, and means operatively connected with the package filling mechanism for initiating the operation of the assorting means in timed relation to the operation of the package filling mechanism whereby to effect the operation of the check weighing scale and assorting means automatically in synchronism with the cycle of operation of the package filling mechanism.

5. The combination with mechanism for filling successive packages with flowable solid material, of a check weighing device including a scale, locking means therefor, said locking means being operative to return the scale to initial weighing position after each weighing operation, package moving means, means for preventing movement of the package until the package filling mechanism and check weighing device have completed their operation and the check weighing device has been locked, means for controlling the operation of the check weighing scale locking means from the package filling mechanism, assorting means controlled by said check weighing device for separating from the packages being discharged those whose weights vary from a predetermined value, and means operatively connected with the package filling mechanism for initiating the operation of the assorting means in timed relation to the operation of the package filling mechanism whereby to effect the operation of the check weighing device and assorting means automatically in synchronism with the cycle of operation of the package filling mechanism.

6. In an automatic weighing machine, in combination, mechanism for filling successive packages with flowable solid material, including a weighing device having a scale locking mechanism, mechanism including a scale for checking the weights of the packages after they have been filled, locking mechanism therefor, said last named locking mechanism being operative to return the scale to initial weighing position after each weighing operation, package moving mechanism for moving successive packages to and from filling position and to and from check weighing position, and connections between the scale locking mechanism of the filling mechanism and the locking mechanism of the checking mechanism for controlling the operation of the locking mechanism of the checking mechanism from the scale locking mechanism of the filling mechanism, control mechanism for preventing the initiation of the operation of the package moving mechanism until the package filling and check weighing mechanism have completed their operation and the check weighing scale locked, an assorting mechanism, and means operatively connected with the package filling mechanism for initiating the operation of the assorting mechanism in timed relation to the operation of the package filling mechanism whereby to effect the operation of the checking mechanism and assorting mechanism automatically in synchronism with the cycle of operation of the package filling mechanism.

7. In an automatic weighing machine in combination, mechanism for filling successive packages with flowable solid material including a weighing device having scale locking mechanism, package moving means, a check weighing scale, locking means therefor, said locking means being operative to return the scale to initial weighing position after each weighing operation, and connections between said scale locking mechanism and said scale locking means for controlling the operation of the check weighing scale locking means from the scale locking mechanism of the filling mechanism, means for preventing movement of the packages until the package filling means and check weighing scale have completed their operation and the check weighing scale locked, an assorting mechanism, and means operatively connected with the package filling mechanism for initiating the operation of the assorting mechanism in timed relation to the operation of the package filling mechanism whereby to effect the operation of the check weighing scale and assorting mechanism automatically in synchronism with the cycle of operation of the package filling mechanism.

8. In an automatic weighing machine, in combination, mechanism for filling successive packages with flowable solid material including a weighing device, mechanism for checking the weights of the packages after they have been filled including a scale, locking means therefor, said locking means being operative to return the scale to initial weighing position after each weighing operation, package moving mechanism for moving successive packages to and from filling position and to and from check weighing position, means for controlling the operation of the check weighing scale locking means from the filling mechanism, control mechanism for preventing the initiation of the operation of the package moving mechanism until the package filling and check weighing mechanism have completed their operation and the check weighing scale has been locked, and assorting means controlled by said check weighing mechanism for separating from the packages being discharged those whose weights vary from a predetermined value and means operatively connected with the package filling mechanism for initiating the operation of the assorting means in timed relation to the operation of the package filling mechanism whereby to effect the operation of the check weighing mechanism and assorting means automatically in synchronism with the cycle of operation of the package filling mechanism.

9. An automatic weighing machine for filling successive packages with flowable solid material having, in combination, package filling mechanism including package filling means, a check weighing scale, an assorting mechanism, package transferring mechanism for transferring simultaneously packages into and from package filling and check weighing position, and means operatively connected with the package filling mechanism for initiating the operation of the assorting mechanism in timed relation to the operation of the package filling mechanism whereby to effect the operation of the check weighing and assorting mechanism automatically in synchronism with the cycle of operation of the packaging filling mechanism.

10. An automatic weighing machine for filling successive packages with flowable solid material and of the type operating in cycles comprising a weighing device including a scale, means for filling a package positioned upon the scale by feeding said solid material into the package, means controlled by the scale for interrupting said feeding of the material when said scale makes its weight, a check weighing device for checking the weight of a filled package during the filling of the first mentioned package, package moving means, assorting means, an operating and controlling mechanism for affecting the operation of the machine in cycles including a driving element, a driven element, a control device connecting said elements, means for initiating and causing predetermined movement of the package when the filling scale makes its weight whereby the package movement is caused to take place during one portion of a complete cycle in the operation of the machine, and means operatively connected with said driving element control device for preventing the initiation of the operation of the assorting means until the weighing operation is completed.

11. An automatic weighing machine, comprising a bulk scale, a drip scale, a check weighing scale, material feeding hoppers for the bulk and drip scales respectively, means actuated by said bulk and drip scales to stop feeding of material from said material feeding hoppers when predetermined weights of material have been fed, a single package transfer mechanism for successively and simultaneously transferring adjacent successive packages to the bulk, drip and check weighing scales when all of the scales have collectively completed their weighing operations, means for controlling the operation of said transfer mechanism, an assorting device cooperating with the check weighing scale, and means operatively connected with said package transfer control means for preventing the operation of said assorting device until the package movement is terminated whereby packages of varying weight are separated by said assorting device.

STANLEY R. HOWARD.